(12) United States Patent
Nagai et al.

(10) Patent No.: US 6,193,281 B1
(45) Date of Patent: Feb. 27, 2001

(54) MECHANISM FOR MOUNTING FLUID PRESSURE MEMBER IN EQUIPMENT-MOUNTING FRAME MEMBER

(75) Inventors: Shigekazu Nagai; Koji Sugano, both of Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/163,007

(22) Filed: Sep. 30, 1998

(30) Foreign Application Priority Data

Oct. 21, 1997 (JP) .................................................... 9-306650

(51) Int. Cl.$^7$ ...................................................... F16L 55/00
(52) U.S. Cl. .......................... 285/86; 285/125.1; 285/360
(58) Field of Search ................................. 285/376, 125.1, 285/86, 360, 361, 377, 362, 396, 401, 402

(56) References Cited

U.S. PATENT DOCUMENTS

| | | | |
|---|---|---|---|
| 1,011,284 | * 12/1911 | Utz et al. | 285/376 |
| 1,253,065 | * 1/1918 | Looze | 285/360 |
| 2,050,647 | * 8/1936 | Corta | 285/376 |
| 2,823,699 | * 2/1958 | Willis | 285/376 |
| 3,370,144 | * 2/1968 | Arthur et al. | 285/376 |
| 3,468,565 | * 9/1969 | Roder | 285/360 |
| 3,480,300 | * 11/1969 | Jeffery | 285/376 |
| 4,695,047 | * 9/1987 | Ehrhardt et al. | |
| 4,782,852 | 11/1988 | Legris . | |
| 5,806,897 | * 9/1998 | Nagai et al. | 285/125.1 |

FOREIGN PATENT DOCUMENTS 33 04 567    8/1964 (DE) .
33 46 111   10/1984 (DE) .
9-100983     4/1997 (JP) .

* cited by examiner

*Primary Examiner*—Dave W. Arola
(74) *Attorney, Agent, or Firm*—Oblon, Spivak, McClelland, Maier & Neustadt, P.C.

(57) ABSTRACT

A body 8 of the pipe joint 7 to be mounted in a frame member 1 has engaging locking portions 12 that are inserted into the mounting grove 2 and rotated through a specified angle in such a way as to be engagingly locked in opening edges 4; and a detent member 20 constituting a lock mechanism, the detent members 20 is composed of a pair of junction pieces 21 of the same shape that are joined together so as to sandwich the body 8 of the pipe joint 7, to slide in the axial direction, the junction pieces 21 are connected together at winged portions 21b and 21c protruding from the respective sides, and springs are accommodated inside the winged portions between the body 8 and the junction pieces 21.

3 Claims, 5 Drawing Sheets

MECHANISM FOR MOUNTING FLUID PRESSURE MEMBER IN EQUIPMENT-MOUNTING FRAME MEMBER

FIELD OF THE INVENTION

The present invention relates to a mounting mechanism for fluid pressure members that can easily install or remove fluid pressure members such as pipe joints for piping connections, plugs used to occlude fluid holes that are no longer used, or pressure detectors, in or from a frame member providing two functions by operating a) as a mounting member to allow a fluid pressure apparatus such as a solenoid valve or a cylinder, or its control apparatus to be mounted and b) as a conduit that guides a pressurized fluid such as compressed air.

PRIOR ART

Japanese Patent Application Laid Open No. 9-100983, for example, discloses a well-known mechanism including equipment-mounting grooves in the outer surfaces of a frame member in the longitudinal direction, each groove having an interior width greater than the groove opening. Inside the mounting grooves, this mechanism includes fluid channels penetrating the frame member in the same direction as the grooves to guide a pressurized fluid, wherein various fluid pressure members such as pipe joints for piping connections, plugs used to occlude fluid holes that are no longer used, or pressure detectors are mounted on the frame member at the opening position of a connection hole drilled between the inner bottom of the mounting groove and the fluid channel.

The fluid pressure member mounted in the frame member has in a mounting portion of its body, a horizontal width smaller than the opening width of the mounting groove and a length larger than the opening width, and includes engaging locking portions that are inserted into the mounting groove and rotated through a specified angle in such a way as to be engagingly locked in the opening edges of the mounting groove; and a seal member for sealing the circumference of the connection hole when the engaging locking portions are engagingly locked in the opening edges of the mounting groove.

When the engaging locking portions provided in the mounting portion of the body are simply inserted into the mounting groove and rotated through the specified angle, the fluid pressure member may still slip due to vibrations after mounting. Thus, a lock mechanism is efficiently provided that includes a detent member having a protruding portion that is elastically fitted between the opening edges of the mounting groove to inhibit any slipping of the engaging locking portions due to rotation when the engaging locking portions are engagingly locked in the opening edges of the mounting groove.

This mechanism, however, must have a simple structure, must be prevented from slipping despite operational error, and must be easy to operate.

DISCLOSURE OF THE INVENTION

It is an object of this invention to provide a lock mechanism for engagingly locking the engaging locking portions of a mounting mechanism for a fluid pressure member, such as that described above, into the opening edges of a mounting groove, with said lock mechanism having a simple structure and being easy to operate.

To achieve this objective, this invention improves a mounting mechanism comprising a frame member including equipment-mounting grooves provided on its outer surfaces in a longitudinal direction, which have internal width greater than the groove opening, and including inside the mounting grooves, fluid channels penetrating the frame member in the same direction as the grooves to guide a pressurized fluid, the mounting mechanism mounting a fluid pressure member in the frame member at the opening position of a connection hole drilled between the inner bottom of the mounting groove and the fluid channel. This invention is characterized in that the fluid pressure member mounted in the frame member has in a mounting portion of its body, a horizontal width smaller than the opening width of the mounting groove and a length larger than the opening width, in that the fluid pressure member includes engaging locking portions that are inserted into the mounting grooves and rotated through a specified angle in such a way as to be engagingly locked in the opening edges of the mounting groove; and a seal member for sealing the circumference of the connection hole when the engaging locking portions are engagingly locked in the opening edges of the mounting groove, in that the body includes as a lock mechanism, a detent member having a protruding portion that is elastically fitted between the opening edges of the mounting groove to inhibit any slipping of the engaging locking portions due to rotation when the engaging locking portions are engagingly locked in the opening edges of the mounting groove, in that the detent member is composed of a pair of junction pieces of the same shape that are joined together so as to sandwich the body of the fluid pressure member, to slide in the axial direction of the body, and to be prevented from rotation, in that the junction pieces are connected together at winged portions protruding from the respective sides of the body, and in that springs are accommodated inside the winged portions between the body and the junction pieces in such a way as to urge the junction pieces toward the mounting groove in the frame member.

In the mounting mechanism of the fluid pressure member, spring seats are provided in the body of the fluid pressure member and the winged portions of the junction pieces, to receive the ends of the springs that urges the junction pieces toward the mounting groove in the frame member, and the spring seats provided on the body of the fluid pressure member are fitted in spring accommodating grooves formed in the junction pieces to disable the relative rotation between the body and the detent member.

The fluid pressure member is generally configured as a pipe joint but may be constructed as one of various fluid pressure members that are mounted in the frame member in connection with the connection hole in the bottom of the mounting groove.

In a mounting mechanism of the above configuration, when the mounting portion of the body of the fluid pressure member such as a pipe joint is inserted into the mounting grooves at the opening position of the connection hole formed in the inner bottom of each groove in the frame member and the body of the fluid pressure member is pushed in against the urging force of the spring while rotating the detent member to rotate the body through a required rotating angle, the fluid pressure member is mounted in the frame member in such a way that the engaging locking portions protruding from the respective sides of the mounting portion are engagingly locked in the opening edges of the mounting groove and that the seal member seals the circumference of the opening of the connection hole. Once the detent member has rotated the body through the required angel of rotation, the urging force of the spring causes the protruding portions provided on the pair of junction pieces constituting the detent member to advance elastically into the mounting grooves to inhibit the rotation of the body of the fluid pressure member, thereby locking the body in such a way that it is mounted in the mounting grooves. This configuration prevents the fluid pressure member from slipping out from the mounting groove due to vibrations after installation.

In addition, to remove the fluid pressure member mounted in the frame member, the detent member may be seized and pulled outward while rotating it, thereby detaching the protruding portions of the junction pieces from the mounting groove and rotating the body of the fluid pressure member with the detent member. Thus, the engaging locking portions protruding from the respective sides of the mounting portion can be directed toward the mounting groove to unlock the engaging locking portions from the opening edges of the mounting groove, thereby enabling the fluid pressure member to be removed from the mounting groove in the frame member.

The fluid pressure member can be configured as one of various instruments that are mounted in the mounting grooves in connection with the fluid channel inarhe frame member, including a pipe joint for piping connection, a plug used to occlude a fluid hole that is no longer used, or the connection portion of a pressure detector.

In this mounting mechanism for fluid pressure members, the lock mechanism for engagingly locking the body of the fluid pressure member is constructed by joining together a pair of junction pieces of the same shape, with the junction pieces connected together at winged portions on the respective sides, and the springs accommodated inside the winged portions. Thus, this mechanism has a simple structure, allows the winged members to be effectively used to rotate the detent member of the fluid pressure member and the body, and is easy to operate. In addition, the fluid pressure member mounted in the mounting groove in the frame member cannot be removed unless the detent member is pulled while rotating it through the specified angle, thereby minimizing the possibility of operational errors or any detachment of the fluid pressure member due to unintentional contact.

DETAILED DESCRIPTION

Figure 1:
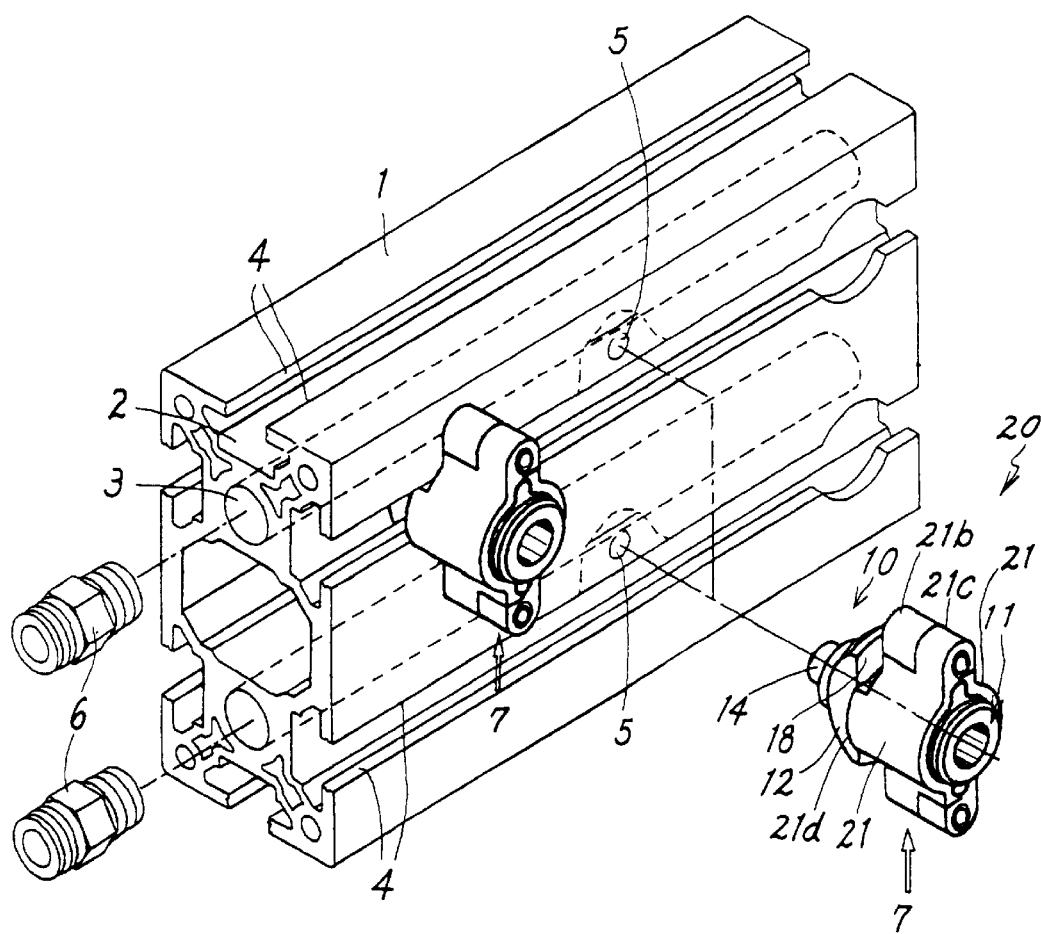
FIG. 1 is a perspective view of an embodiment of this invention.

The drawings show an embodiment of a mounting mechanism for fluid pressure members according to this invention. According to this embodiment, a frame member 1, when assembled like a supporting frame, can be configured to operate both as a structure in which a fluid pressure apparatus such as a solenoid valve or a cylinder or its control apparatus is mounted and as a conduit used to guide a pressurized fluid such as compressed air. The frame member is a long material having a substantially rectangular cross section and formed by extrusion molding of a material such as aluminum alloy, having sufficient strength and rigidity for the structure. The frame member 1 has mounting grooves 2 provided on its respective outer sides in a longitudinal direction in which various apparatuses are mounted, with fluid channels 3 located inside the mounting grooves 2 and penetrating the frame member in the same direction as the grooves to guide a pressurized fluid.

The mounting groove 2 need not be provided in each of the outer sides of the frame member 1, but a plurality of mounting grooves may be provided on one surface. In addition, although the figure shows two fluid channels 3 in the frame member, at least one fluid channel 3 may be provided.

The mounting groove 2 has an internal width greater than its opening, and within this opening is formed a pair of opening edges in which a pipe joint for piping connection, a plug used to occlude a fluid hole that is no longer used, or the connection portion of a pressure detector is engagingly locked, as described below. A connection hole 5 is drilled between the inner bottom of the mounting groove 2 and the fluid channel 3 as required to allow the fluid pressure member to be mounted. The illustrated embodiment shows a pipe joint 7 as a general example of the fluid pressure member. Thus, piping such as tubes can be connected to the pipe joint 7 to supply and exhaust compressed air to and from various apparatuses through the fluid channels 3 in the frame member 1 via the connection holes 5 and the pipe joint 7 and further through this piping. In FIG. 1, reference numeral 6 designates the joints used to supply and exhaust a pressurized fluid between an adjacent frame member and the fluid channels 3.

The pipe joint 7 mounted in the frame member 1 at the opening position of the connection hole 5 in the mounting groove 2 has a mounting portion 10 that is mounted in the frame member 1, formed at one end of a cylindrical body 8 of synthetic resin including a through-hole 9 inside, while also having a piping connection member (a quick-handling pipe joint) 11 to which a piping tube is connected, installed at the other end. The mounting portion 10 has a width smaller than the opening width of the mounting groove 2 and a length larger than the opening width, and includes engaging locking portions 12 that are engagingly locked in a pair of opening edges 4 of the respective sides of the mounting groove when rotationally moved inside the mounting groove 2; a seal member 13 that seals the circumference of the connection hole 5 when the engaging locking portions 12 are engagingly locked in the opening edges 4 of the mounting groove; and a bush 14 that is fitted in the connection hole 5 to guide the installation of the pipe joint 7.

Thus, by using as a guide the bush 14 inserted into the connection hole 5 to insert the pair of engaging locking portions 12 of the mounting portion 10 into the mounting groove 2 and to rotate the engaging locking portions 12 through a specified angle (90°) in order to direct the engaging locking portions 12 perpendicularly to the mounting groove 2, the engaging locking portions 12 can be engagingly locked in the opening edges 4 of the mounting groove 2, thereby enabling the body 8 of the pipe joint 7 to be mounted in the mounting groove 2 while allowing the seal member 13 to pressure-contact the groove bottom to seal the circumference of the connection hole 5.

The piping connection member 11 is configured as a well-known, one-touch pipe joint having a claw 15 that is engagingly locked in a tube when it is inserted in the member 11 and releasing the tube engagingly locked by the claw 15 when the release bush 16 is pressed. The configuration of the piping connection member 11 is not limited to this aspect; another means may be used to connect the tube to the member 11. In this figure, 17 is a packing in the piping connection member 11.

Figure 6:
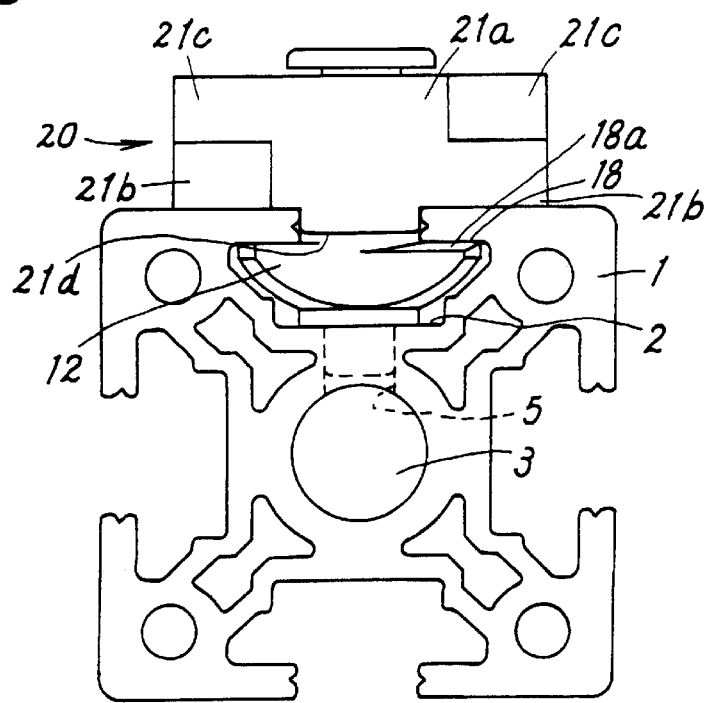
FIG. 6 is a horizontal sectional view showing the pipe joint mounted in the frame member.
Figure 7:
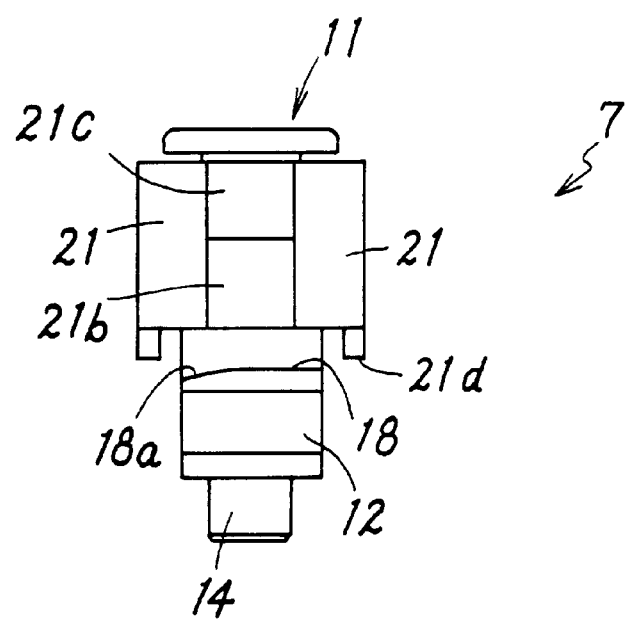
FIG. 7 is a front view of the pipe joint.

In addition, as shown in FIGS. 6 and 7, the engaging locking portions 12 of the pipe joint 7 each have an abutting surface 18 abutting the opening edges 4 of the mounting groove 2 wherein half of the abutting surface 18 in the direction of the horizontal width, that is, half of the side that is first engagingly locked in the opening edges 4 due to rotation, is cut in the form of a circular arc or a slope to form a slanted portion 18a. This configuration enables the end of the abutting surface 18 to ride easily on the opening edge 4 when the pipe joint 7 is rotated to abut and engage the engaging locking portions 12 with the inner surfaces of the opening edges 4.

At the same time, as a lock mechanism, the body 8 includes a detent member 20 having a protruding portion that is elastically fitted between the pair of opening edges 4 of the mounting groove 2 to inhibit the detachment of the engaging locking portions 12 due to rotation, when the engaging locking portions 12 are engagingly locked in the pair of opening edges 4 of the mounting groove 2.

Figure 4:
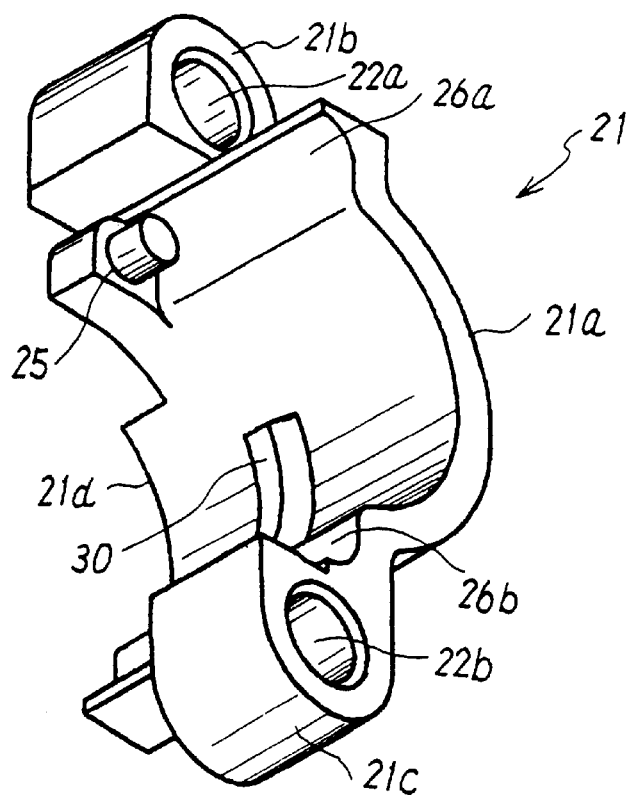
FIG. 4 is a perspective view showing the structure of junction pieces of a detent member in the pipe joint.
Figure 5:
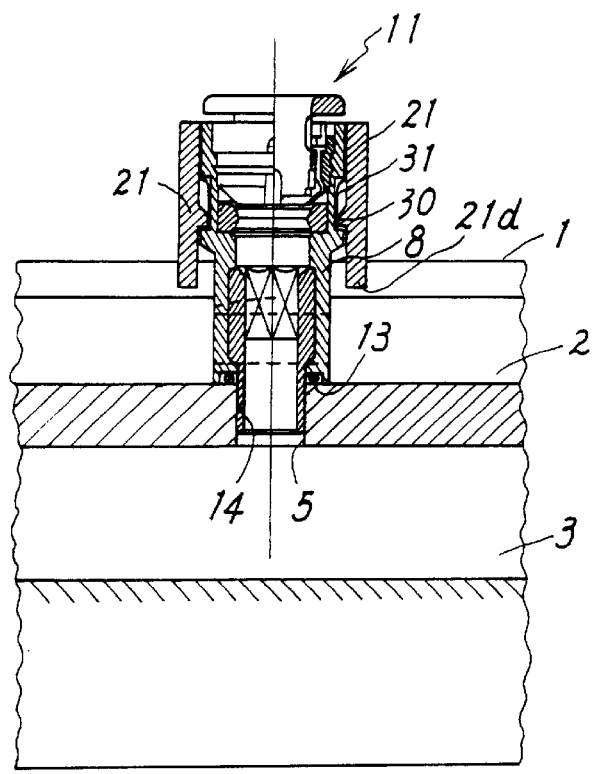
FIG. 5 is a vertical sectional view showing the pipe joint mounted in a frame member.

The detent member 20 is composed of a pair of junction pieces 21 of the same shape formed of synthetic resin and joined together in such a way as to sandwich the body 8 of the pipe joint 7. FIG. 4 clearly shows the shape of the junction pieces 21.

The junction piece 21 comprises a half cylindrical portion 21a for mounting surrounding the circumference of the body 8 of the pipe joint 7; winged portions 21b and 21c located on the respective sides of the half cylindrical portion 21a and formed to protrude from the respective sides of the body 8; and a protruding portion 21d that is connected to the half cylindrical portion 21a and that is fitted and engagingly locked between the pair of opening edges 4 of the mounting groove 2 to inhibit the rotation of the engaging locking portions 12. One of the winged portions 21b is connected to the inserting half of the pipe joint in the axial direction and possesses a bottomed fitting hole 22a in which a junction pin 23 is fitted; it also is equipped with a spring seat 25 and a recessed portion 26a acting as a spring accommodating groove, both of which serve to receive one end of a spring 24 urging the junction pieces 21 toward the mounting groove 2 in the frame member 1. The other winged portion 21c is connected to the opposite half of the half cylindrical portion 21a in the axial direction, and possesses both a fitting hole 22b in which the junction pin 23 is fitted and a recessed portion 26b acting as a spring accommodating groove in which the spring 24 and spring seats 19 protruding from the circumference of the body 8 are fitted. The spring seats 19 on the body 8 are fitted into the spring accommodating grooves formed by the recessed portions 26a and 26b in the junction pieces 21, to disable any relative rotation between the body 8 and the detent member 20.

A protrusion 30 provided on the inner surface of the half cylindrical portion 21a of the junction piece 21 and a recess 31 provided in the outer surface of the body 8 at the corresponding position are fitted together to restrain the axial range of motion of the body 8 and the detent member 20.

Figure 2:
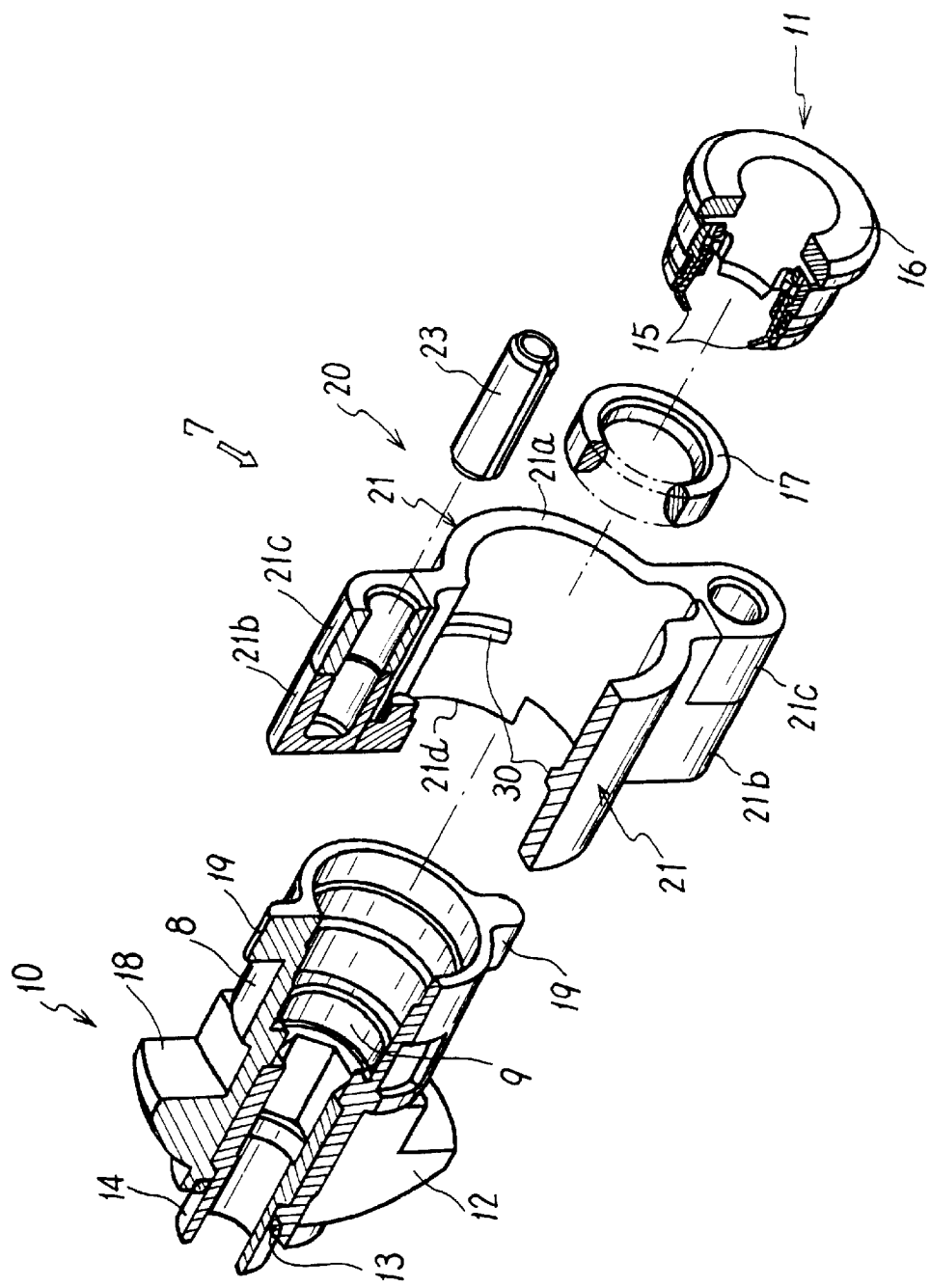
FIG. 2 is an exploded perspective view of a pipe joint according to this embodiment.
Figure 3:
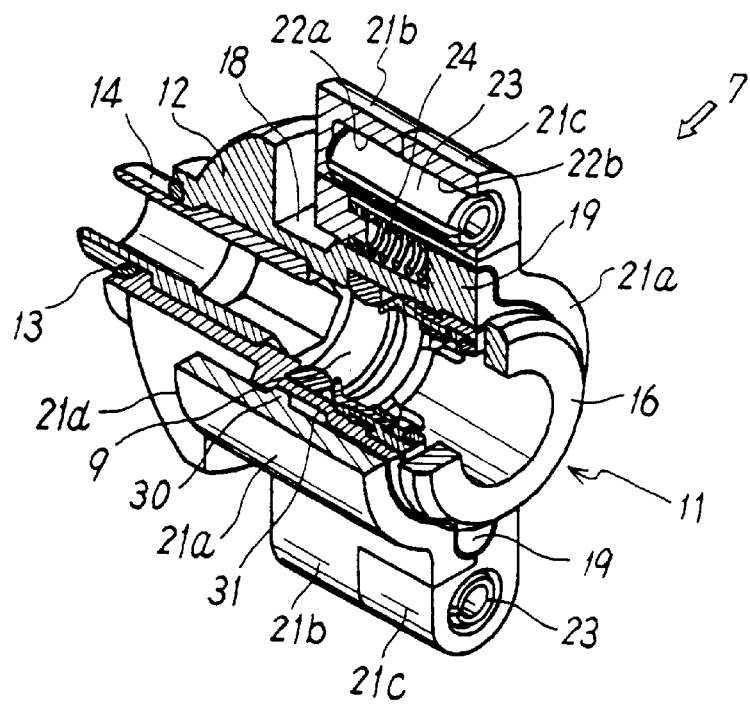
FIG. 3 is a partly broken perspective view of the pipe joint.

As seen in FIGS. 2 and 3, the pair of junction pieces 21 are joined together, the winged portions 21b and 21c of the pair of opposed junction pieces 21 are respectively overlapped together in such as way as to align with the fitting holes 22a and 22b for the junction pins 23, respectively, the junction pins 23 are inserted into the fitting holes 22a and 22b in the winged portions, and the mouths of the fitting holes 22b are caulked to connect and fix the pair of junction pieces 21 together. Based on this configuration, the body 8 and the detent member 20 can slide in the axial direction within the range of motion of the protrusion 30 and the recess 31, and the spring seats 19 on the body 8 are fitted in the spring-accommodating grooves formed by the recessed portions 26a and 26b in the junction pieces 21, thereby joining the pieces together so as to eliminate any rotation.

In addition, in joining the pair of junction pieces 21 together, the spring 24 is accommodated inside the winged portions 21b and 21c between the spring seat 19 of the body 8 and the spring seat 25 of the junction piece 21 to constantly urge the junction pieces 21 toward the mounting groove 2 in the frame member 1.

In the mounting mechanism for the pipe joint 7 having the above configuration, the mounting portion 10 of the body 8 of the pipe joint 7 is inserted into the mounting groove 2 at the opening position of the connection hole 5, located in the inner bottom of the mounting groove 2 in the frame member 1, and the body 8 of the pipe joint 7 is pushed in against the urging force of the spring 24 while rotating the detent member 20 to rotate the body 8 through a required angle of rotation (90°). Then, the pipe joint 7 is mounted in the frame member 1 in such a way that the engaging locking portions 12 protruding from the respective side of the mounting portion 10 are engagingly locked in the opening edges 4 of the mounting groove 2 and that the seal member 13 seals the opening circumference of the connection hole 5. When the detent member 20 is used to rotate the body 8 through the required 90°, the protruding portion 21d provided on the pair of junction pieces 21 constituting the detent member 20 elastically advances into the mounting groove 2, due to the urging force of the spring 24, to inhibit the rotation of the body 8 of the pipe joint 7 in order to lock the body in the mounting groove 2 in such a way that the body is mounted therein. Thus, the pipe joint 7 is prevented from slipping out from the mounting groove 2 due to vibrations after mounting.

In addition, to remove the pipe joint 7 mounted in the frame member 1, the detect member 20 may be seized and pulled outward while rotating it, thereby detaching the protruding portion 21d of the junction pieces 21 from the mounting groove and rotating the body 8 of the pipe joint 7 with the detent member 20. Thus, the engaging locking portions 12 protruding from the respective sides of the mounting portion 10 can be directed toward the mounting groove 2 to unlock the engaging locking portions 12 from the opening edges 4 of the mounting groove 2, thereby enabling the pipe member 7 to be removed from the mounting groove 2 in the frame member 1.

In this mounting mechanism for the pipe joint 7, the lock mechanism for engagingly locking the body of the pipe joint 7 is constructed by joining together a pair of junction pieces 21 of the same shape, with the junction pieces 21 connected together at the winged portions 21b and 21c on its respective sides, and the springs 24 accommodated inside the winged portions 21b and 21c. Thus, this mechanism has a simple structure, allows the wing members 21b and 21c to be effectively used to rotate the detent member 20 of the pipe joint 7 and the body 8, and is easy to operate. In addition, the pipe joint 7 mounted in the mounting groove 2 of the frame member 1 cannot be removed unless the detent member 20 is pulled while rotating it through the specified angle, thereby minimizing the possibility of operational error or any detachment of the pipe joint due to unintentional contact.

According to the mounting mechanism of this invention described above, in a known mounting mechanism for fluid pressure members, a lock mechanism for engagingly locking the engaging locking portions that are engagingly locked in the mounting groove in the frame member in the opening edges of the mounting groove,. can be adapted so as to have a simple structure and be easy to operate.

What is claimed is:

1. A mounting mechanism for mounting a fluid pressure member in an equipment-mounting frame member including mounting grooves in its side face, which mounting grooves have internal width greater than a groove opening width, the frame member including internal fluid channels, and a connection hole communicating with the fluid channel at a bottom portion of the mounting groove, the mounting mechanism mounting the fluid pressure member in the frame member at a position of the connection hole, wherein:

said fluid pressure member has a body including a through hole for fluid inside the body, a mounting portion formed on one end of the body to be mounted to the frame member, and a lock mechanism for locking the body in a state in which the body is mounted to the frame member, wherein said mounting portion has engaging locking portions that engagingly lock the body in a mounting groove in insides of opening edges of the mounting groove when the body is inserted into the mounting groove and rotated through a specified angle, and a seal member positioned for sealing a circumference of the connection hole when the engaging locking portions arc engagingly locked in said opening edges, wherein said lock mechanism includes a cylindrical detent member fitted to an outer circumference of the body to be movable in an axial direction of the body and to be fixed in a rotating direction, a pair of protruding portions formed on one end of the detent member spaced apart greater than the width of the groove opening and fittable in the mounting groove opening, and a spring provided between the body and the detent member to elastically bias the detent member in such a direction that the protruding portions are fitted into the mounting groove opening when the fluid pressure member is mounted in the frame member, and wherein the detent member is composed of a pair of identical junction pieces, each junction piece comprising a half cylindrical portion surrounding half a circumference of the body, one of the pair of protruding portions, and two winged portions, the winged portions being located on mutually opposite axial ends of the half cylindrical portion, pairs of the winged portions of the junction pieces being connected together.

2. A mounting mechanism according to claim 1, wherein the detent member has two spring-accommodating grooves for accommodating two springs at portions where the pair of junction pieces are joined together, the body of the fluid pressure member has on an outer face thereof two spring seats fitted in the spring-accommodating grooves, and the spring seats are fitted in the spring accommodating grooves to mount the body and the detent member such that any relative rotation of the body and the detent member is restricted.

3. A mounting mechanism according to claim 1 or 2 wherein the fluid pressure member is a pipe joint.

* * * * *